(12) United States Patent
Kek

(10) Patent No.: US 7,275,887 B2
(45) Date of Patent: Oct. 2, 2007

(54) SECURING MEANS

(76) Inventor: Chiang See Kek, 119A Jalan SS 21/37, Damansara Utama, 47400 Petaling Jaya, Selangor (MY)

(*) Notice: Subject to any disclaimer, the term of this patent is extended or adjusted under 35 U.S.C. 154(b) by 0 days.

(21) Appl. No.: 10/671,733

(22) Filed: Sep. 29, 2003

(65) Prior Publication Data

US 2005/0031407 A1    Feb. 10, 2005

(30) Foreign Application Priority Data

Aug. 8, 2003   (MY) .............................. PI 20033018

(51) Int. Cl.
*F16B 19/00*   (2006.01)
(52) U.S. Cl. ...................... 403/230; 403/289; 411/509
(58) Field of Classification Search ................ 403/230, 403/231, 289, 290; 411/508, 509, 510, 913
See application file for complete search history.

(56) References Cited

U.S. PATENT DOCUMENTS

| | | | | |
|---|---|---|---|---|
| 2,956,605 A | * | 10/1960 | Rapata | ........................ 411/531 |
| 3,153,975 A | * | 10/1964 | Rapata | .......................... 24/295 |
| 3,272,952 A | * | 9/1966 | McKeon | ...................... 200/293 |
| 3,306,141 A | * | 2/1967 | Hall et al. | ................ 81/177.85 |
| 3,728,761 A | * | 4/1973 | Holly | ......................... 411/80.1 |
| 4,012,155 A | * | 3/1977 | Morris | ........................ 403/290 |
| 5,143,500 A | * | 9/1992 | Schuring et al. | ............ 411/339 |
| 5,775,859 A | * | 7/1998 | Anscher | ........................ 411/38 |
| 6,302,630 B1 | * | 10/2001 | Grant | ........................ 411/372.6 |
| 6,374,455 B1 | * | 4/2002 | Regele et al. | .................. 16/2.1 |
| 6,769,849 B2 | * | 8/2004 | Yoneoka | ........................ 411/45 |
| 6,866,455 B2 | * | 3/2005 | Hasler | ........................... 411/21 |

* cited by examiner

*Primary Examiner*—Gary S. Hartmann
(74) *Attorney, Agent, or Firm*—Birch, Stewart, Kolasch & Birch, LLP

(57) ABSTRACT

A means used for securing a first structure (32A) and a second structure (34) of a furniture (30) according to the present invention wherein the means comprises of a tubular receptacle (38) consisting of an internal cylindrical member spaced apart from an external cylindrical member and wherein both are integrally connected to a terminal end, and wherein the external cylinder member includes at least one hinged member (54) and at least one groove (60) on its side perimeter wall (46) and wherein the receptacle (38) is introducible and securable into a bore (40) on the first structure (32A) of the furniture (30) in a tight manner by action of the hinged member (54) and groove (60).

15 Claims, 5 Drawing Sheets

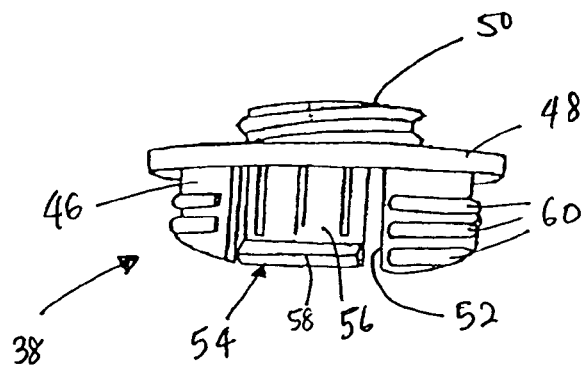
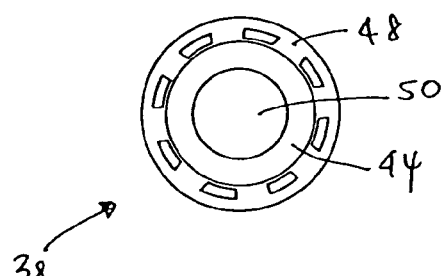
FIGURE 3   FIGURE 4
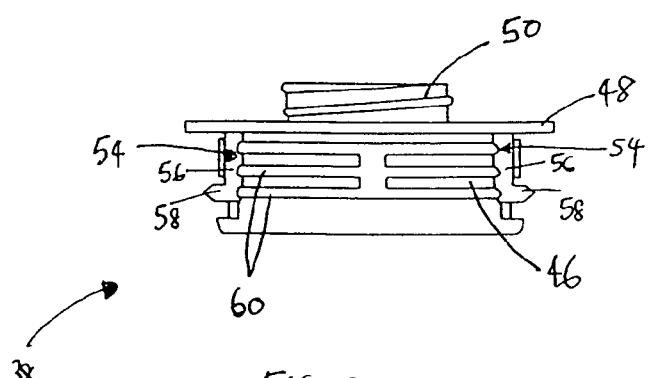
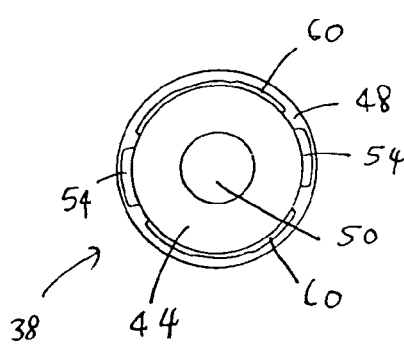
FIGURE 5   FIGURE 6

SECURING MEANS

This nonprovisional application claims priority under 35 U.S.C. § 119(a) on Patent Application No. PI 20033018 filed in Malaysia on Aug. 8, 2003, the entire contents of which are hereby incorporated by reference.

FIELD OF THE INVENTION

The present invention relates a securing means used for securing a first member and a second member of a furniture.

BACKGROUND OF THE INVENTION

Recently there has been a huge demand in self-assembled structures such as furniture, i.e. tables, chairs, cabinets and the like. These types of self-assembled furniture are also widely known as "Do It Yourself" furniture. A user can purchase said furniture in loose forms which are packed in a packaging. The user will have to assembled the said loose forms of the furniture according to an assembly instructions enclosed in the packaging to form a one piece rigid structure.

The present inventor has observed one disadvantage in the prior art method of assembling said furniture. To further describe the disadvantage, reference is made to FIG. 1, which shows a perspective view of a one tier pre-assembled table (10). Said table (10) consists of a pair of rectangular shaped flat boards (12A, 12B), four elongated supporting rods (14) and four leg members (16). Further to this, each of the said flat boards (12A, 12B) is provided with four bores (18A) and (18B) respectively. The terminal end portions of each of the said elongated supporting rods (14) are provided with a threaded portion (20). Generally, the threaded portion (20) has a smaller diametrical dimension compared to the diametrical dimension of the elongated supporting rod (14). Each of the said bores (18A) and (18B) are designed in such a manner that the internal diametrical dimension of each of the bores (18A, 18B) is smaller in dimension compared to the external diametrical dimension of the elongated supporting member (14) but greater then the external diametrical dimension of the threaded portion (20) (not illustrated). With this configuration, when the elongated supporting members (14) are introduced into the bores (18A) of board (12A), the said board (12A) will rest on the terminal edges of the said elongated supporting member (14). Each of the bores (18A) at the upper surface of the flat board (12A) is further provided with a cap member (22). Said cap member (22) consists of a cap portion (24) and an externally threaded cylindrical member (26). The externally threaded cylindrical member (26) is design to be adapted onto the threaded portion (20) of each of the elongated supporting rods (14) by screw-threaded means. The other flat board (12B) is introduced and assembled in the same manner as described above. The only difference is that, the bores (18B) at the lower surface of the flat board (12B) are adapted fixed to the said leg members (16). When all the components have been assembled, the table (10) as shown in FIG. 1 is formed. The disadvantage of this type of assembly is at the upper surface of the flat board (12A).

The upper surface of the flat board (12A) is no longer a smooth surface. The four cap members (22) are clearly noticeable and this can be an eye sore to certain individuals. There was an attempt to create a smooth upper surface by providing a flat board with a thicker dimension. Further to this, each bore is only created half way through the thickness of the flat board. The elongated supporting rods are either matingly fixed into the bores or are fixed to the bores by means of screw threading. The internal of the bore is threaded by creating grooves along its inner perimeter sidewall or by inserting an external component which is provided with threading means. However, these types of configurations have resulted in the user to utilized tools to assembled said furniture. This is against the actual idea of 'do it yourself' furniture where the user is not required to use any type of tools when assembling the furniture. Further to this, the attachment between to structure by these means is not strong and may fail if it is often assembled and dissembled.

Therefore, it is the objective of the present invention to introduce an improvement in the method of assembling parts of a furniture and introducing a new device for performing the said method.

Another objective of the present invention is to ensure that the upper surface of the furniture is always smooth without the present of any visible components.

Another objective of the present invention is to ensure that the user is not required to use any type of tools when assembling a furniture and at the same time ensuring that the strength of the attached parts of the furniture is preserved.

SUMMARY OF THE INVENTION

A means used for securing a first structure and a second structure of a furniture according to the present invention comprises of a tubular receptacle consisting of an internal cylindrical member spaced apart from an external cylindrical member, in which both are integrally connected to a terminal end. The external cylinder member includes at least one hinged member and at least one groove on its side perimeter wall and wherein the receptacle is introducible and securable into a bore on the first structure of the furniture in a tight manner by action of the hinged member and groove. The hinged member of the present invention is thinner at its hinged end and thicker at its free end. The hinged member further includes a node at its free end.

Further to this the hinged member is displaceable away from its vertical axis towards the internal cylindrical member when the receptacle is fitted into the bore of the first structure of the furniture. The hinged member is also displaceable from its vertical axis away from the internal cylindrical member of the tubular receptacle into the body of the first structure of the furniture on introduction of the second structure onto the tubular receptacle.

BRIEF DESCRIPTION OF THE DRAWINGS

FIG. 3 is a perspective view of a receptacle used in the present invention.

FIG. 4 is a plan view of the receptacle as shown in FIG. 3.

FIG. 5 is a side view of the receptacle as shown in FIG. 3.

FIG. 6 is a bottom view of the receptacle as shown in FIG. 3.

DETAILED DESCRIPTION OF THE INVENTION

The present invention will now be described with reference made to the accompanied drawings.

Figure 1:
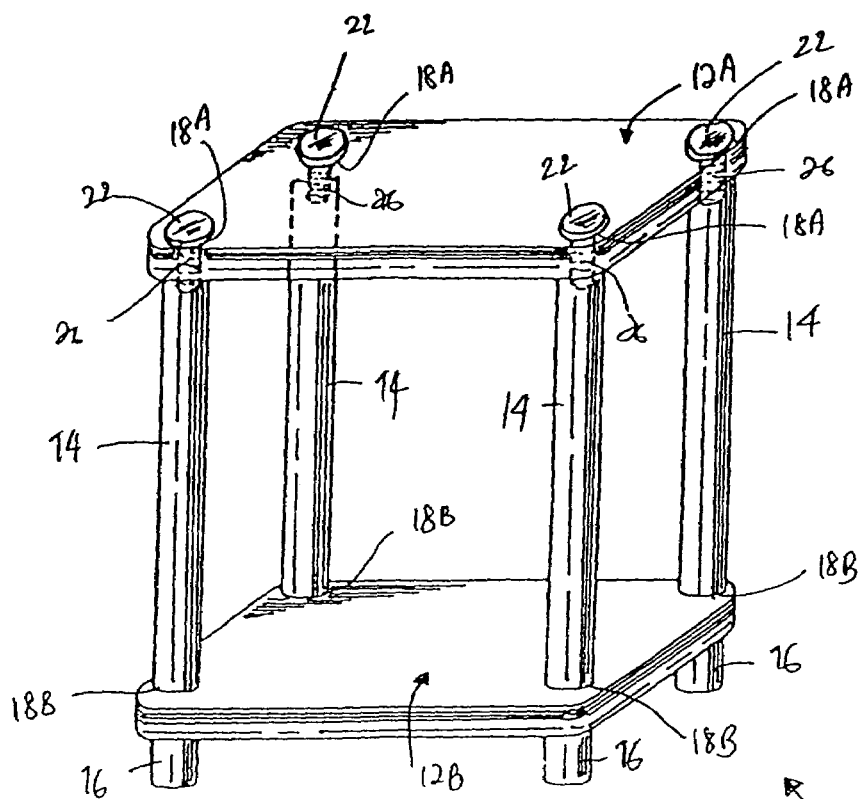
FIG. 1 is a perspective view of a furniture utilizing a prior art method of assembling and securing two structures.
Figure 2:
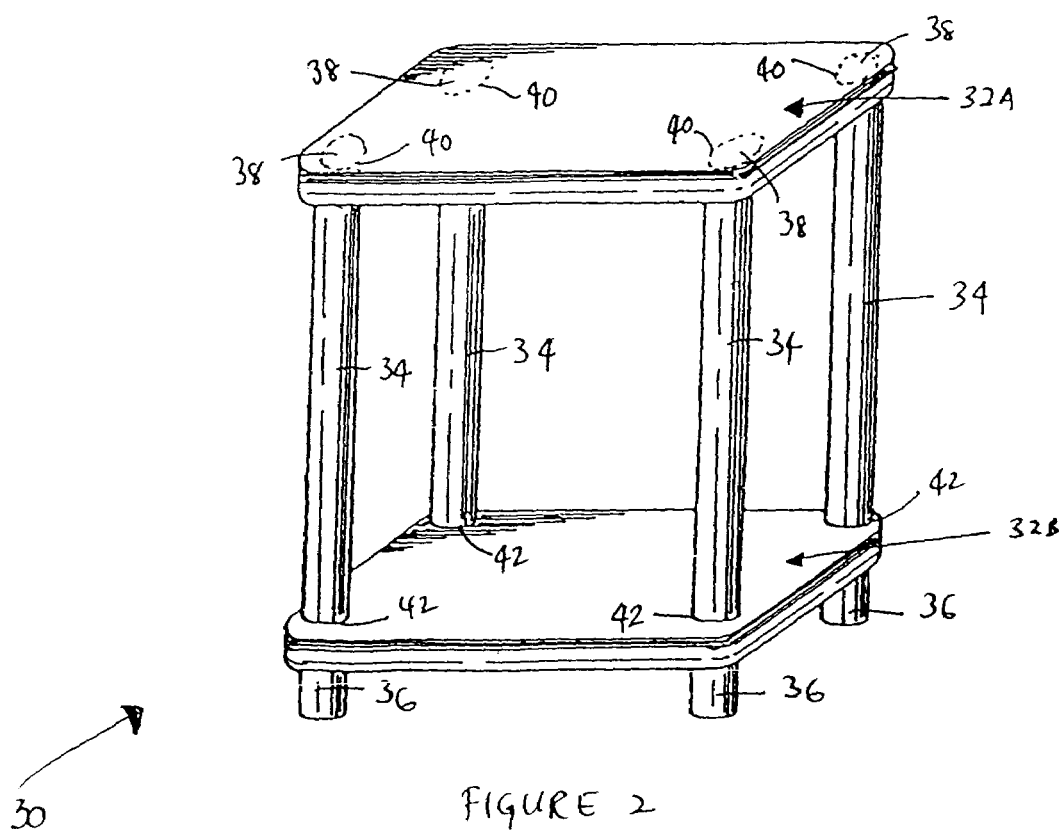
FIG. 2 is a perspective view of the furniture as shown in FIG. 1 utilizing the improve method of assembling and securing according to the present invention.
Figure 2A:
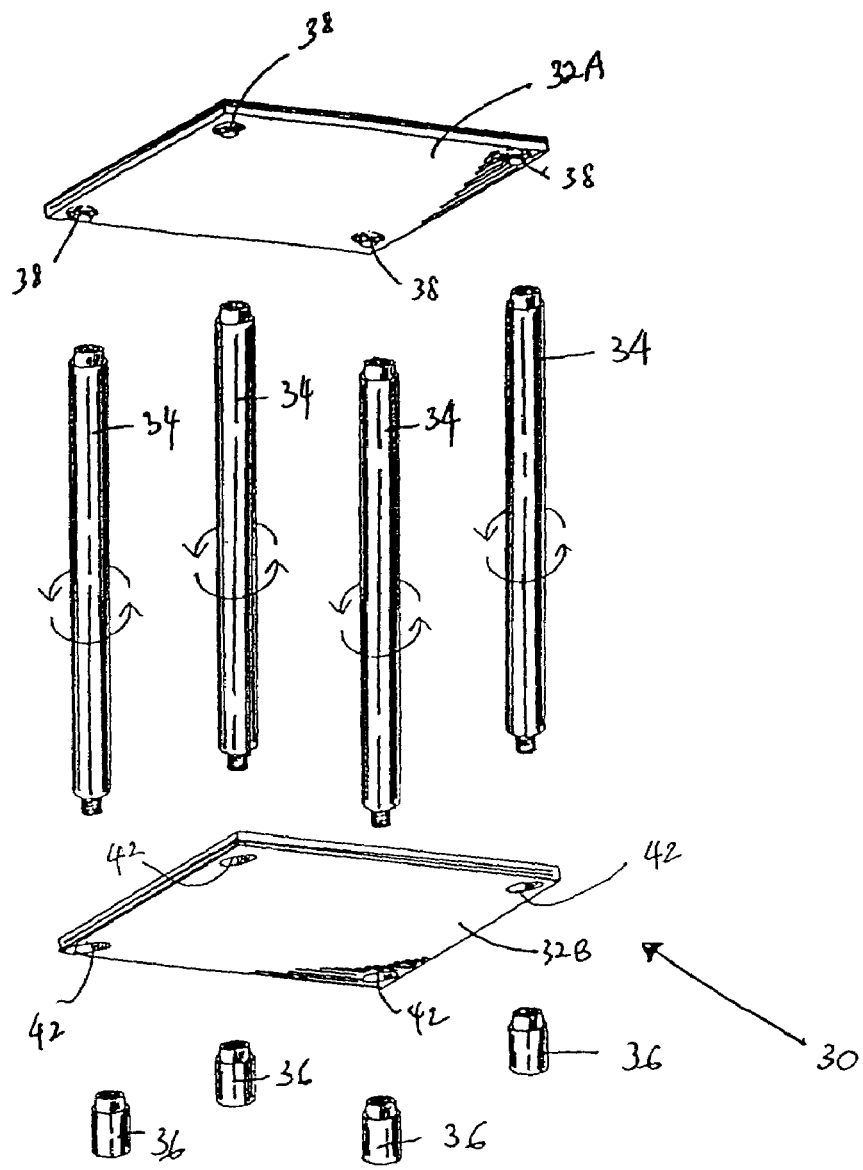
FIG. 2A is a perspective view of the furniture as shown in FIG. 2 in an assembling manner.
Figure 2B:
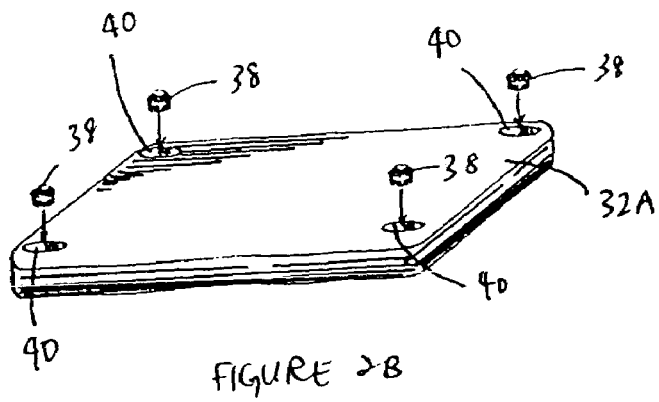
FIG. 2B is a perspective view of the furniture as shown in FIG. 2 showing the manner a receptacle is introduced according to the present invention.

FIGS. 2, 2A and 2B show an example of a furniture, hereinafter referred as a table (30). Generally the overall design of this table (30) is no different than the table (10) of the prior art. The present table (30) still comprises of a pair of flat board (32A, 32B), at least four elongated supporting members (34) and at least four leg members (36). The present invention further comprises of a receptacle (38), FIGS. 3, 4, 5 and 6.

Figure 7:
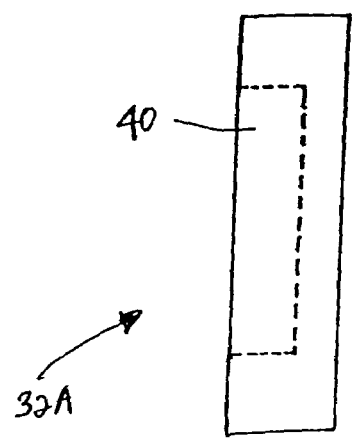
FIG. 7 is a diagrammatic view of the configuration of a bore of the present invention

The flat board (32A) is further provided with at least four bores (40), in which each bore is positioned at each edge of the flat board (32A). Said bores (40) are designed in such a manner that each bore is preferably created half way through the thickness of the flat board (32A). In other words, the bores (40) are not visible on the upper surface of the flat board (32A), FIG. 7. The purpose of this type of arrangement will be described later.

The other flat board (32B) is also provided with at least four bores (42), in which each bore is positioned at each edge of the flat board (32B). However, these bores (42) are designed to be created a hole in the flat board (32B). When both the said flat boards (32A, 32B) are placed on top one another, all the bores (40, 42) will be in a linear alignment with each other.

The elongated supporting members (34) and the leg members (36) have already been described in the background of the invention and will not be described further in the detailed description of the invention.

The receptacle (38) as shown in FIGS. 3, 4, 5 and 6 is generally a tubular shaped member in cross section. The receptacle (38) comprises of a base (44), a concentric upstanding side wall (46), a concentric flange (48) integrally mounted onto the terminal portion of the concentric upstanding side wall (46) and a cylindrical member (50) which is externally threaded and integrally mounted in the mid section of the said receptacle (38). The said cylindrical member (50) is preferably a hollow cylindrical structure but however, a solid cylindrical member can also be utilized. The height of the concentric upstanding sidewall (46) and the height of the cylindrical member (50) correspond to the height of a threaded portion (48) at the terminal edge of the elongated supporting member (34). Further to this, the thickness of each of the bores (40) in the flat board (32A) corresponds to the height of the concentric upstanding sidewall (46) of the receptacle (38). In the preferred embodiment, the cylindrical member (50) is designed to have a greater height than the height of the concentric upstanding sidewall (46). However, the height of the cylindrical member (46) can be adjusted according to the required strength of attachment between two structures.

Further to this, the concentric upstanding side wall (46) is provided with at least two cut-out portions (52) along its perimeter length. Each of the said cut-out portions (52) is provided with a hook means (54), FIGS. 5 and 6. The hook means (54) is generally an 'L' shaped member in cross section, in which it consists of a first member (56) and a second member (58). Both said members (56, 58) are integrally mounted to each other. The free end of the second member (58) is preferably tapered to form a sharp edge like section. The purpose of such a configuration will be described later in the description. One end of the first member (56) is integrally mounted at the underside of the concentric flange (48) and is positioned within the sides of the cut-out portion (52). In other words, only top edge of the hook means (54) is integrally mounted onto the underside of the concentric flange (48). The other edges of the hook means (54) are free ends. The second member (58) vertically extends away from the concentric upstanding sidewall (46) of the receptacle (38). Additional to this, the external side of the concentric upstanding sidewall (46) of the receptacle (38) is provided with a plurality of grooves (60) along its perimeter length. The purpose of the said grooves (60) will be described later in the description.

The method of assembling the above mentioned components to form a rigid structure such a table (30) will be described in detail now.

Figure 8:
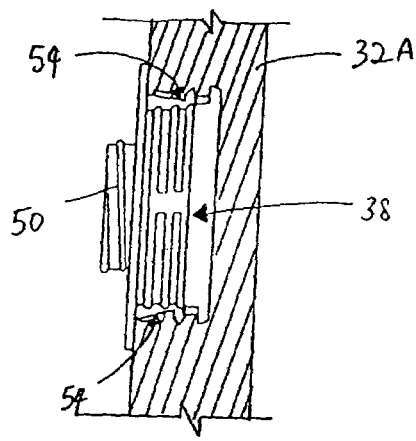
FIG. 8 is a cross-sectional diagrammatic view of the receptacle in the bore without a supporting member held therein according to present invention.
Figure 9:
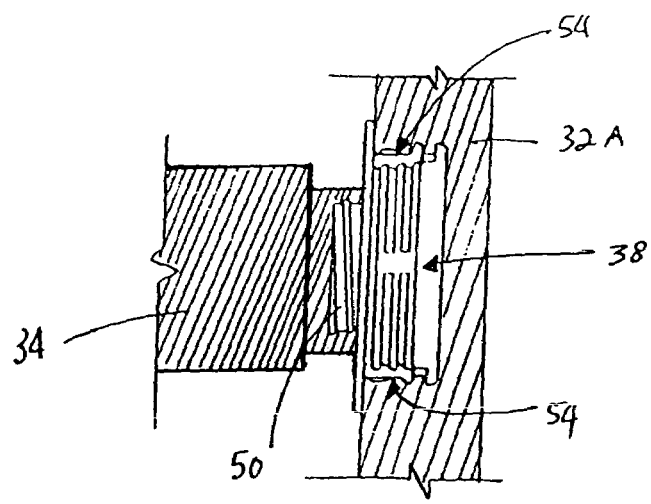
FIG. 9 is a cross-sectional diagrammatic view of the receptacle in the bore as shown in FIG. 8 with a supporting member held therein.
Figure 10:
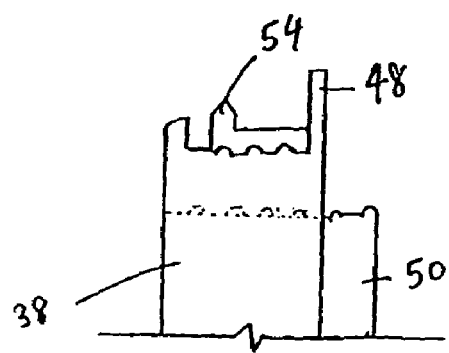
FIG. 10 shows a diagrammatic view of a portion of the receptacle of the present invention before introducing into a bore.
Figure 11:
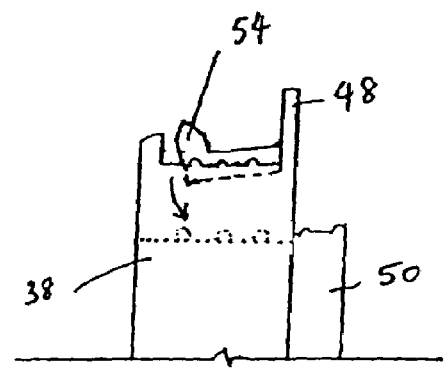
FIG. 11 shows a diagrammatic view of the receptacle as shown in FIG. 10 when is introduced into the bore.
Figure 12:
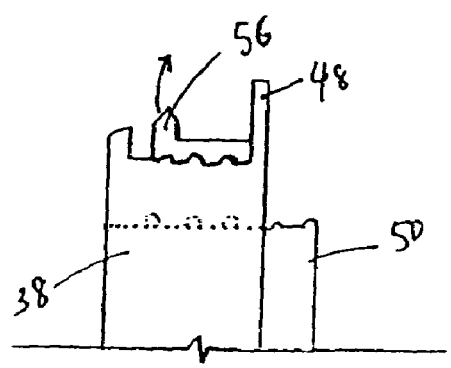
FIG. 12 shows a diagrammatic view of the receptacle as shown in FIG. 11 when a supporting member is introduced onto the receptacle.

The external dimension of the receptacle (38) is marginally smaller then the internal dimension of the bore (40). To introduce the receptacle (38) into the bore (40), the receptacle (38) is angularly inserted into the bore (40). This is to ensure that at least one of the hook means (54) is securely inserted into the bore first. Then by using a finger, slight pressure is asserted onto the other hook means (54) to push this hook means (54) into the internal side of the receptacle (38). Then by using a user palm, vertical pressure is applied onto the receptacle (38) to securely fit the receptacle into the bore (40). Each of the bores (40) on the flat board (32A) is provided with one receptacle (38) and is secured therein the same manner as described above. When the said receptacles (38) are securely held in the bores (40), both the hooks means (54) are disposed away from its longitudinal axis. FIG. 8. In other words, the hook means (54) are angularly pushed into the inner side of the concentric upstanding side stall (46) of the receptacle (38). Now, each of the said bores (40) with the receptacles (38) secured therein is introduced to the elongated support member (34). The elongated support member (38) is rotatingly secured to the receptacle (38) by threaded means. As the elongated support member (34) is rotated, the terminal end of the elongated support member (34) will forcibly push the inwardly disposed hook means (54) back into its vertical position. This will result in the hook means (54) to grip the inner perimeter sidewall of the bore (40). Same arrangement is done on the other receptacles (38) on the flat board (32A). When the elongated support members (34) are removed from the receptacles (38), the hook means (54) will return to its angularly disposed position, FIG. 9. The remaining parts of the furniture (30) is assembled as describe in the prior art. Further reference can be made to FIGS. 10, 11 and 12, which shows the position of the hinged member (54) at different time.

Once the receptacles (38) are securely held in the bores (40), it is not easy remove them. However, the said receptacles (38) can be forcibly removed by using external force such as a tool. But still, the purpose of introducing the present invention is to securely position a receptacle in the bore (40) in a tight manner without having it to be removed after securing it in the bores (40).

In the present invention, the receptacle (38) is used in assembling a table (30), however, the present invention can also be used to assembled any type of furniture which requires the upper surface to be a flat smooth surface. Further to this, the present invention can also be applied to any part of the furniture fittings to ensure that a smooth surface is achieved after assembling the furniture.

The number of bores (40, 42), elongated support members (34), leg structure (36), receptacles (38) and hook means (54) can vary according to the design of the furniture.

Also, the present receptacle (38) is preferably made of a malleable material such as plastics, however, any type of malleable material known in the art can be used to achieve the same results as the present invention.

The invention claimed is:

1. A tubular receptacle used for securing a first structure and a second structure of furniture, the tubular receptacle being introducible and securable into a bore on the first structure, and comprising:
   a base,
   an external cylindrical member mounted directly on and in contact with said base, the external cylindrical member having a side perimeter wall with at least one hinged member, and
   an internal cylindrical member mounted directly on and in contact with said base, the internal cylindrical member being spaced apart from and inside of said external cylindrical member.

2. The tubular receptacle as set forth in claim 1, wherein said hinged member has a hinged end and a free end and wherein the hinged end is thinner than the free end.

3. The tubular receptacle as set forth in claim 1, wherein said hinged member includes a protrusion at a free end thereof.

4. The tubular receptacle as set forth in claim 1, wherein said hinged member moves away from the internal cylindrical member upon insertion of a second structure onto the internal cylindrical member.

5. The tubular receptacle as set forth in claim 1, wherein said hinged member has a vertical axis and is displaceable away from said vertical axis and towards said internal cylindrical member when said receptacle is fully inserted into a bore of a first structure of furniture.

6. The tubular receptacle as set forth in claim 1, wherein said hinged member has a vertical axis and is displaceable away from said vertical axis and away from said internal cylindrical member of said tubular receptacle and into the body of a first structure of furniture upon introduction of a second structure into said tubular receptacle.

7. The tubular receptacle as set forth in claim 1, wherein said internal cylindrical member is threaded.

8. The tubular receptacle as set forth in claim 7, wherein a second member is screwable onto said threaded internal cylindrical member to cam the hinged member to outwardly engage sides of a bore.

9. The tubular receptacle as set forth in claim 1, wherein said external cylindrical member has at least one groove.

10. Furniture comprising a first structure and a second structure where the second structure is connected to the first structure by the tubular receptacle as set forth in claim 1.

11. The tubular receptacle as set forth in claim 1, wherein a longitudinal axis of the external cylindrical member passes through a center of the internal cylindrical member and wherein the external cylindrical member and the internal cylindrical member are on a same side of the base.

12. A tubular receptacle used for securing a first structure and a leg structure of furniture, the tubular receptacle being introducible and securable into a bore on the first structure, the tubular receptacle comprising:
   a base;
   an external cylindrical member mounted on said base, the external cylindrical member having a longitudinal axis and having a side perimeter wall with grooves thereon and with at least one cut-out hinged member with a node at a free end, the at least one cut-out hinged member being movable away from the longitudinal axis of the external cylindrical member upon insertion of an end of the leg structure onto the internal cylindrical member;
   an internal cylindrical member mounted on said base, the internal cylindrical member being spaced from and inside of said external cylindrical member, the internal cylindrical member receiving one end of the leg structure of the furniture.

13. The tubular receptacle as set forth in claim 12, wherein the longitudinal axis of the external cylindrical member passes through a center of the internal cylindrical member and wherein the external cylindrical member and the internal cylindrical member are on a same side of the base.

14. The tubular receptacle as set forth in claim 12, wherein said internal cylindrical member is threaded.

15. The tubular receptacle as set forth in claim 14, wherein the leg structure is screwable onto said threaded internal cylindrical member to cam the hinged member to outwardly engage sides of a bore in the first structure.

* * * * *